US012067967B2

(12) United States Patent
Robotham

(10) Patent No.: US 12,067,967 B2
(45) Date of Patent: Aug. 20, 2024

(54) POWER CONTROL FOR PIEZO SOUNDER

(71) Applicant: Carrier Corporation, Palm Beach Gardens, FL (US)

(72) Inventor: Martin Paul Robotham, Bradenton, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 911 days.

(21) Appl. No.: 17/058,182

(22) PCT Filed: May 16, 2019

(86) PCT No.: PCT/US2019/032601
§ 371 (c)(1),
(2) Date: Nov. 24, 2020

(87) PCT Pub. No.: WO2019/231700
PCT Pub. Date: Dec. 5, 2019

(65) Prior Publication Data

US 2021/0166670 A1 Jun. 3, 2021

Related U.S. Application Data

(60) Provisional application No. 62/679,198, filed on Jun. 1, 2018.

(51) Int. Cl.
*G10K 9/122* (2006.01)
*G08B 3/10* (2006.01)
(Continued)

(52) U.S. Cl.
CPC ............... *G10K 9/122* (2013.01); *G08B 3/10* (2013.01); *G10K 9/12* (2013.01); *G10K 9/20* (2013.01)

(58) Field of Classification Search
CPC . G10K 9/122; G10K 9/20; G10K 9/12; G08B 3/10
See application file for complete search history.

(56) References Cited

U.S. PATENT DOCUMENTS 6,087,811 A 7/2000 Crawford et al.
6,940,345 B2 * 9/2005 Nair ...................... H03G 3/348 330/258

(Continued)

FOREIGN PATENT DOCUMENTS

JP H09114467 A 5/1997
WO 2013081773 A1 6/2013

OTHER PUBLICATIONS

International Preliminary Report on Patentability for International Application No. PCT/US2019/032601 mailed Dec. 10, 2020.

(Continued)

*Primary Examiner* — John A Tweel, Jr.
(74) *Attorney, Agent, or Firm* — Carlson, Gaskey & Olds, P.C.

(57) ABSTRACT

A notification appliance is disclosed and includes a sound engine that generates sound according to an acoustic pattern and the power control that regulates input voltage to the sound engine that is matched to the acoustic pattern. A method of powering a sounder is also disclosed and includes providing a constant input current and regulating an input voltage to a phase of a sound engine corresponding with an acoustic signal generated by a sound engine.

17 Claims, 5 Drawing Sheets

(51) Int. Cl.
*G10K 9/12* (2006.01)
*G10K 9/20* (2006.01)

(56) References Cited

U.S. PATENT DOCUMENTS

| | | | | | |
|---|---|---|---|---|---|
| 9,231,543 | B2 * | 1/2016 | Hogan | H03G 3/20 |
| 9,360,511 | B2 * | 6/2016 | Van Lier | G01R 27/2605 |
| 10,916,958 | B2 * | 2/2021 | Robotham | H02J 7/00 |
| 2011/0187541 | A1 | 8/2011 | Noguchi | |
| 2016/0100252 | A1 | 4/2016 | Pattok | |

OTHER PUBLICATIONS

International Search Report and Written Opinion for International Application No. PCT/US2019/032601 mailed Sep. 2, 2019.

* cited by examiner

POWER CONTROL FOR PIEZO SOUNDER

BACKGROUND

Fire alarm and mass notification systems are used to notify the public of the presence of fire, smoke and other potentially harmful conditions. A notification appliance circuit (NAC) may be part of such a system and include many notification devices powered and controlled by a common source and control panel.

A notification appliance may include a notification horn that generates a sound at predetermined intervals with a predetermined acoustic pattern. The notification appliance is typically rated at the lowest sound output and the highest input current across its specified working input voltage range. The sound output may increase in response to increasing input voltage. However, the increased sound output is typically not utilized for rating the notification appliance. Accordingly, any increase in current beyond that required to provide the lowest sound output is not efficient. Manufacturers are continually seeking to improve efficiencies in the manufacture and operation of notification appliances.

SUMMARY

A method of powering a sounder according to an exemplary embodiment of this disclosure includes, among other possible things, providing a constant input current and regulating an input voltage to a phase of a sound engine corresponding with the acoustic signal generated by a sound engine.

In a further embodiment of the foregoing method, regulating a sound output of the sound engine to a constant volume.

In a further embodiment of any of the foregoing methods, input current is stored in an energy store responsive to the sound engine being between phases.

In a further embodiment of any of the foregoing methods, sounds are not generated between phases.

In a further embodiment of any of the foregoing methods, the sound engine draws energy from both the constant input current and the energy store when generating sound.

In a further embodiment of any of the foregoing methods, a power control decreases the input voltage delivered to the sound engine to reduce a sound level generated by the sound engine.

In a further embodiment of any of the foregoing methods, the power control selects from one of a several input voltage levels to provide a corresponding acoustic signal at a corresponding volume.

In a further embodiment of any of the foregoing methods, the ramp rate of voltage is varied to correspond with a sound pattern.

A notification appliance according to another disclosed exemplary embodiment, includes among other possible things, a sound engine generating a sound according to an acoustic pattern and a power control regulating input voltage to the sound engine that is matched to the acoustic pattern.

In a further embodiment of the foregoing notification appliance, the sound engine generates sound when voltage is input.

In a further embodiment of the foregoing notification appliances, including an energy store and an input current to the power control is constant and when the sound engine is not generating sound the input current charges the energy store.

In a further embodiment of any of the foregoing notification appliances, the energy store provides energy to the sound engine when generating sound.

In a further embodiment of any of the foregoing notification appliances, the power control regulates the input voltage to the sound engine to provide a constant volume.

In a further embodiment of any of the foregoing notification appliances, the power control is configurable to adjust a sound level generated by the sound engine.

In a further embodiment of any of the foregoing notification appliances, the power control is configurable to select between one of several input voltage levels to provide a corresponding sound level.

In a further embodiment of any of the foregoing notification appliances, the power control is configurable to adjust a voltage ramp rate to match an acoustic pattern.

A notification appliance circuit (NAC) according to another disclosed exemplary embodiment, includes among other possible things, a plurality of notification appliances connected by circuit wiring to provide electric power, wherein at least one of the plurality of notification appliances includes a sound engine generating a sound according to an acoustic pattern, and a power control regulating input voltage to the sound engine that is matched to the acoustic pattern.

In a further embodiment of the foregoing NAC, the power control includes an energy store and wherein an input current from the NAC to the power control is constant and when the sound engine is not generating sound the input current charges the energy store and the energy store provides energy to the sound engine when generating sound.

In a further embodiment of any of the foregoing NACs, the power control is configurable to adjust a sound level generated by the sound engine.

In a further embodiment of any of the foregoing NACs, the power control is configurable to select between one of several input voltage levels to provide a corresponding sound level.

In a further embodiment of any of the foregoing NACs, the power control is configurable to adjust a voltage ramp rate to match an acoustic pattern Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Fire alarm and mass notification systems are used to notify the public, such as occupants of a building or campus, of the presence of fire, smoke and other potentially harmful conditions. It may be appreciated that in case of fire or other event likely to trigger use of the alarm or mass notification system, it is desirable to output sound likely to attract the attention of those within range of a notification appliance such as a sounder or horn.

Figure 1:
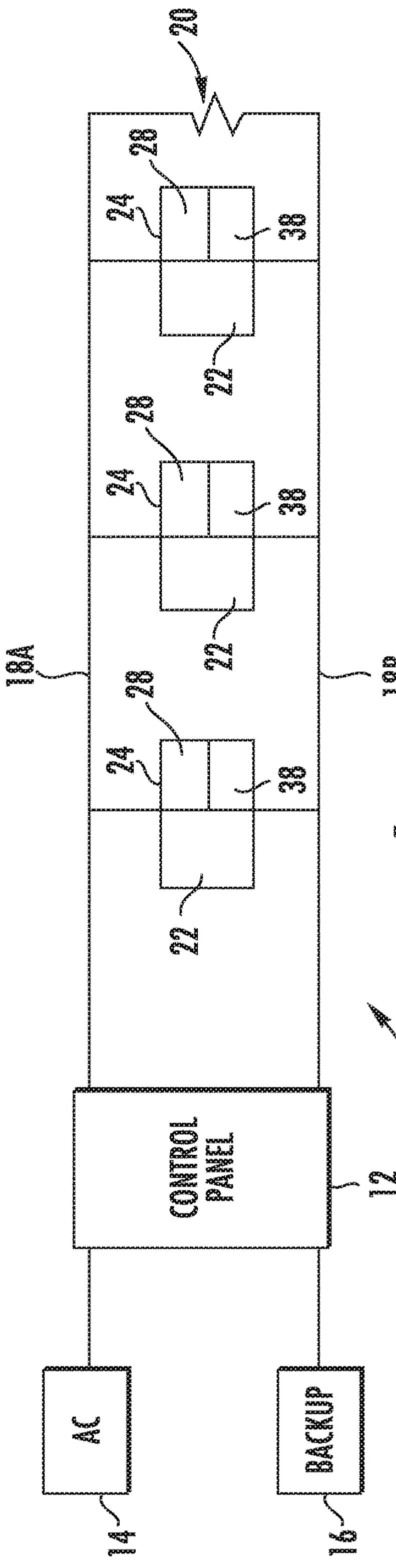
FIG. 1 is a block diagram illustrating an example notification appliance circuit (NAC).

Referring to FIG. 1, a notification appliance circuit (NAC) 10 includes a control panel 12 that receives power from an AC power source 14. The control panel 12 powers and controls a plurality of notification appliances 24 connected by a two wire circuit 18*a*, 18*b* and a termination resistor 20. The control panel 12 may also receive power from a backup power supply 16. The control panel 12 provides power and control signals for operation of the notification appliances 24. While the example NAC 10 includes three notification appliances 24, other numbers of notification appliances could be utilized and contemplated with the context of this disclosure. Each of the example notification appliances 24 include a power control 22 that controls power supplied to a sound engine 28 and a sound temporal pattern generator 38.

Figure 2:
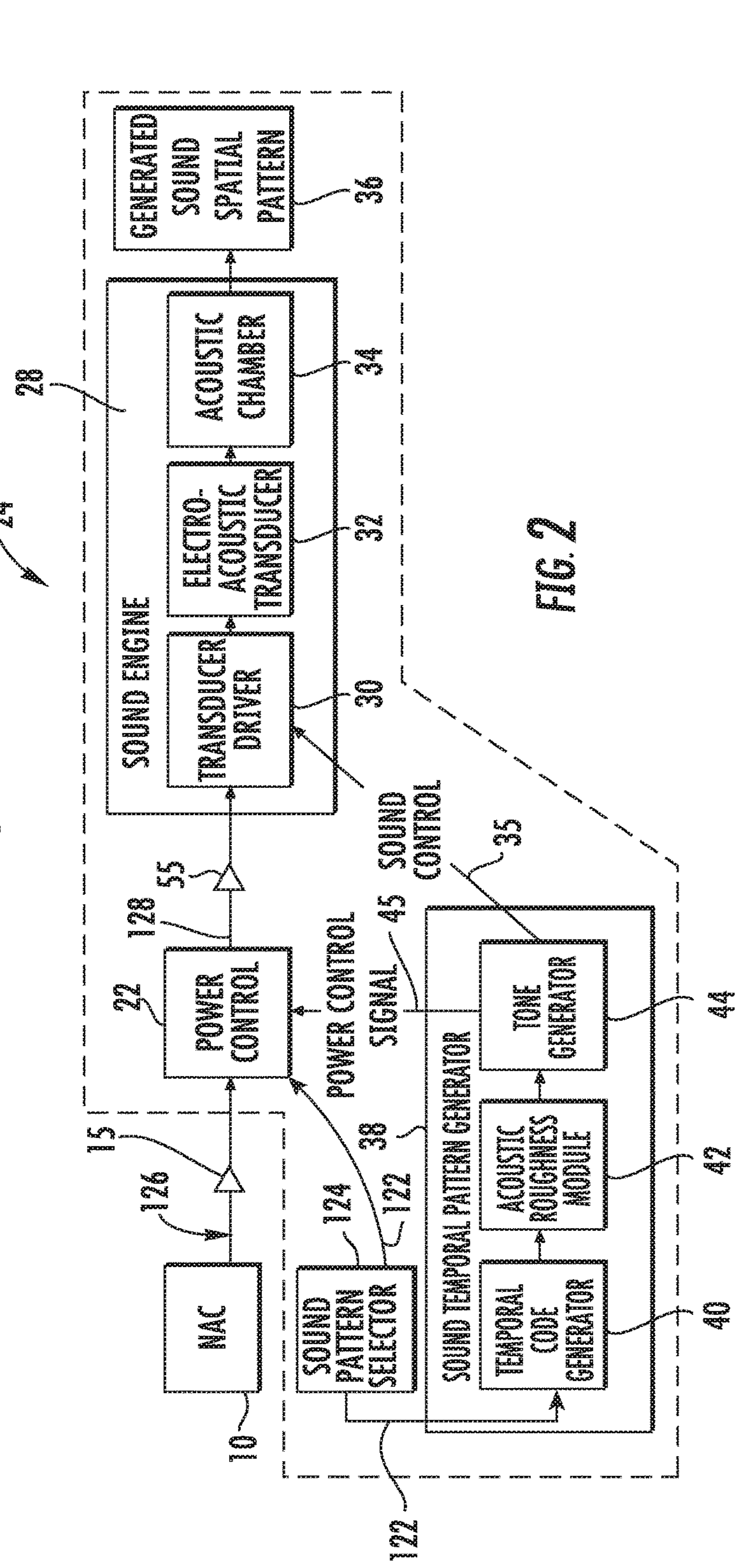
FIG. 2 is a block diagram of a portion of a notification appliance.

Referring to FIG. 2 with continued reference to FIG. 1, a portion of an example notification appliance 24 is schematically shown and includes the sound engine 28 that receives a driver current 55 and driver voltage 128 from the power control 22. The sound engine 28 includes a transducer driver 30, an electro-acoustic transducer 32 and an acoustic chamber 34 that outputs a generated sound spatial pattern 36. The generated sound spatial pattern 36 is the sound as would be heard based on a location and orientation relative to the notification appliance 24. The transducer driver 30 excites a piezo diaphragm and receives sound control information 35 from the sound temporal pattern generator 38. The electro-acoustic transducer 32 is the piezo diaphragm and converts electrical energy into mechanical movement and acoustic energy. Although a piezo diaphragm is disclosed as an example, a sound generator of any known configuration may be utilized and is within the contemplation of this disclosure.

The sound temporal pattern generator 38 includes a temporal code generator 40, an acoustic roughness module 42 and a tone generator 44 that supplies the sound control information 35 to the transducer driver 30. The temporal pattern generator 38 generates the control information 35 utilized by the transducer driver 30 to produce sounds of different frequencies for different alarm sound patterns. A sound pattern selector 124 provides a signal 122 to the temporal code generator 40 and the power control 22. The sound pattern selection signal 122 is selected by an installer at the time of installation of the appliance 24. Selection of the signal 122 can be made by selecting one position of a four position switch to select between two sound patterns and at least two levels of sound power. It should be appreciated that other selection mechanisms could be utilized and are within the contemplation of this disclosure, including but not limited to mechanical mechanisms, and remote wireless or hardwired electronic mechanisms.

The example pattern generator 38 creates signals for generating sounds of different frequencies and patterns including a temporal code (T3) that provides a fire alert sound pattern. One example fire alert sound pattern provides a sound for ½ second followed by no sound for ½ second that is repeated 3 times followed by a delay of 1 second, than repeated. The temporal pattern generator 38 may also instruct a general alarm tone. The T3 temporal code is disclosed and explained by way of example, however, other temporal patterns could be utilized within the contemplation and scope of this disclosure including a temporal pattern that provides a Carbon Monoxide (CO) detection alert sound pattern commonly referred to as T4.

The temporal pattern generator 38 includes the acoustic roughness module 42 that generates a modulation of the sound produced that is intended to enhance the ability of the output sound pattern 36 to attain the attention of those being warned.

Figure 3:
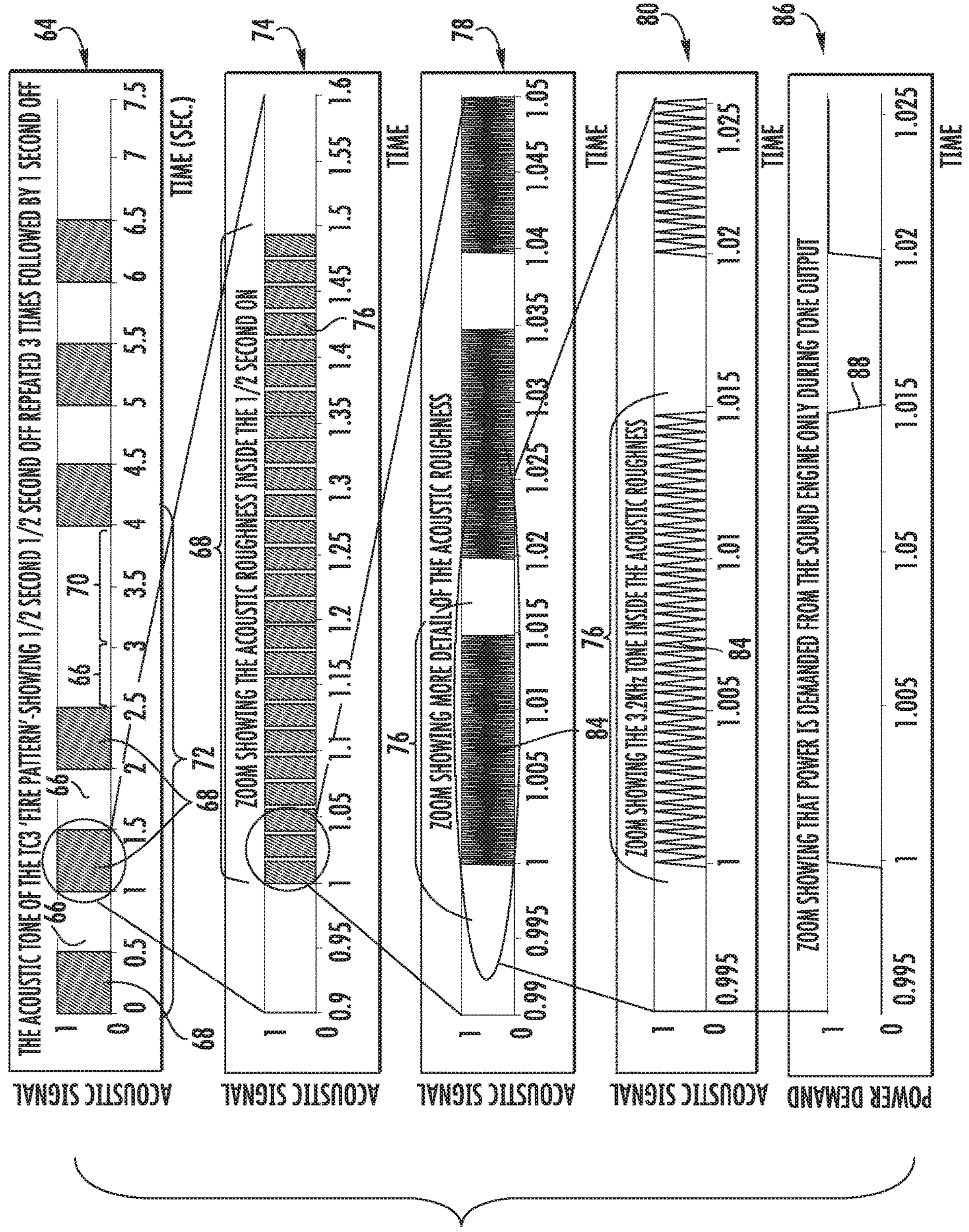
FIG. 3 is a group of graphs illustrating an example acoustic pattern.

Referring to FIG. 3 with continued reference to FIG. 2, the purpose of the sound engine 28, and the output sound pattern 36 is to attract the attention of those within range. Accordingly, a sound waveform is selected that is effective to alert those within range. One model for the sound waveform is the human scream that provides a certain depth and amplitude modulation that is known to be effective at attracting attention. The amplitude modulation utilized to generate the desired sound is referred to as the acoustic roughness. In this disclosed example, the acoustic roughness provides a modulation frequency of around 50 Hz.

The graphs shown in FIG. 3 show the underlying signals that generate the acoustic roughness for a fire alert sound pattern 72. The fire alert sound pattern 72 is shown in the graph indicated at 64 where three periods of sound 68 of ½ second each are generated between ½ second intervals 66 of no sound. The six periods 68 and 66 are followed by a delay 70 of one second and then repeated again. Graphs 74, 78 and 80 zoom in on one period 68 to show the smallest increments of actuation utilized to generate each period 68. Each of the periods 68 comprise a number of higher frequency bursts indicated at 76 in graph 74, and at an increased zoom in graph 78. The bursts 76 are further generated by tones 84 shown in graphs 78 and shown in expanded form in graph 80. Power indicated at 88 in graph 86 is consumed by the electro-acoustic transducer 32 only during the generation of tones.

The power control 22 receives a power control signal 45 from the tone generator 44 that predicts generation of the driver current 55 that powers the sound engine 28. The power control 22 also receives the sound pattern selection signal 122. Power to generate the sound pattern 36 is provided from the input current 15 from the NAC 10.

If the sound engine 28 is configured to produce a sound at a volume that corresponds with the input voltage 126 from the NAC 10, then any rise or change in the input voltage 126 from the NAC 10 would cause a corresponding increase in sound. Accordingly, the input voltage 126 from the NAC 10 would control the volume of the sound output from the sound engine 28. As the sound power output from the sound engine 28 varies, so would the current input 15. Performance of the notification appliance 24 is determined utilizing defined conditions such as input voltage and is utilized for comparison to other appliances and as a means of selecting appliances when designing and planning a NAC. The sound output and input current of the notification appliance at the defined conditions are known as that appliances rating. One example rating records a minimum sound and a maximum current across their specified operating voltage range for the appliances 24. The value of the minimum sound and maximum current is identified as the rating for the appliance 24. The ratings for each appliance 24 are used as comparison to other appliances. As appreciated, an efficient appliance minimizes the rated current required to provide the rated sound output. Sound output above the minimum sound output is not beneficial to the rating. Accordingly, increases in the input current 15 that result in a sound level above the minimum sound output level is a waste of current.

Figure 4:
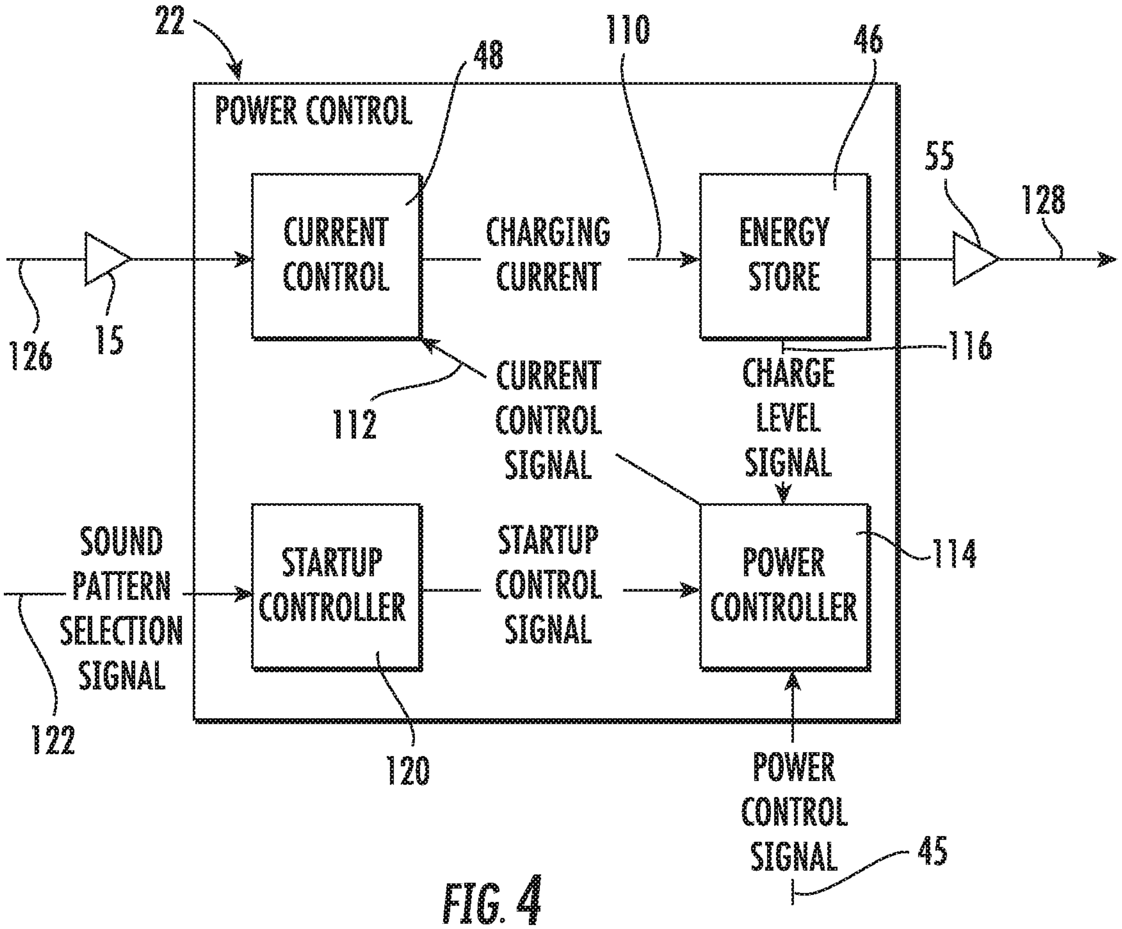
FIG. 4 is a block diagram of a power control for a notification appliance.

Referring to FIG. 4, with continued reference to FIGS. 2 and 3, the example power control 22 includes features that control the sound output from the sound engine 28 and enable a constant and lower input current 15. The power control 22 decouples the sound output from the NAC 10 voltage 126 by regulating a driver voltage 128 to the sound engine 28 to match a phase of a sound control 35. The power control 22 includes voltage regulator functionality in the power controller 114 that produces a current control signal 112 that is used to regulate the charging current 110 communicated to the energy store 46 from a current controller 48. The energy store 46 integrates the charging current 110 to provide a driver voltage 128 and driver current 55 to the sound engine 28. The energy store 46 provides a charge level signal 116 to the power controller 114 for use in a feedback loop for determining the current control signal 112.

Figure 5:
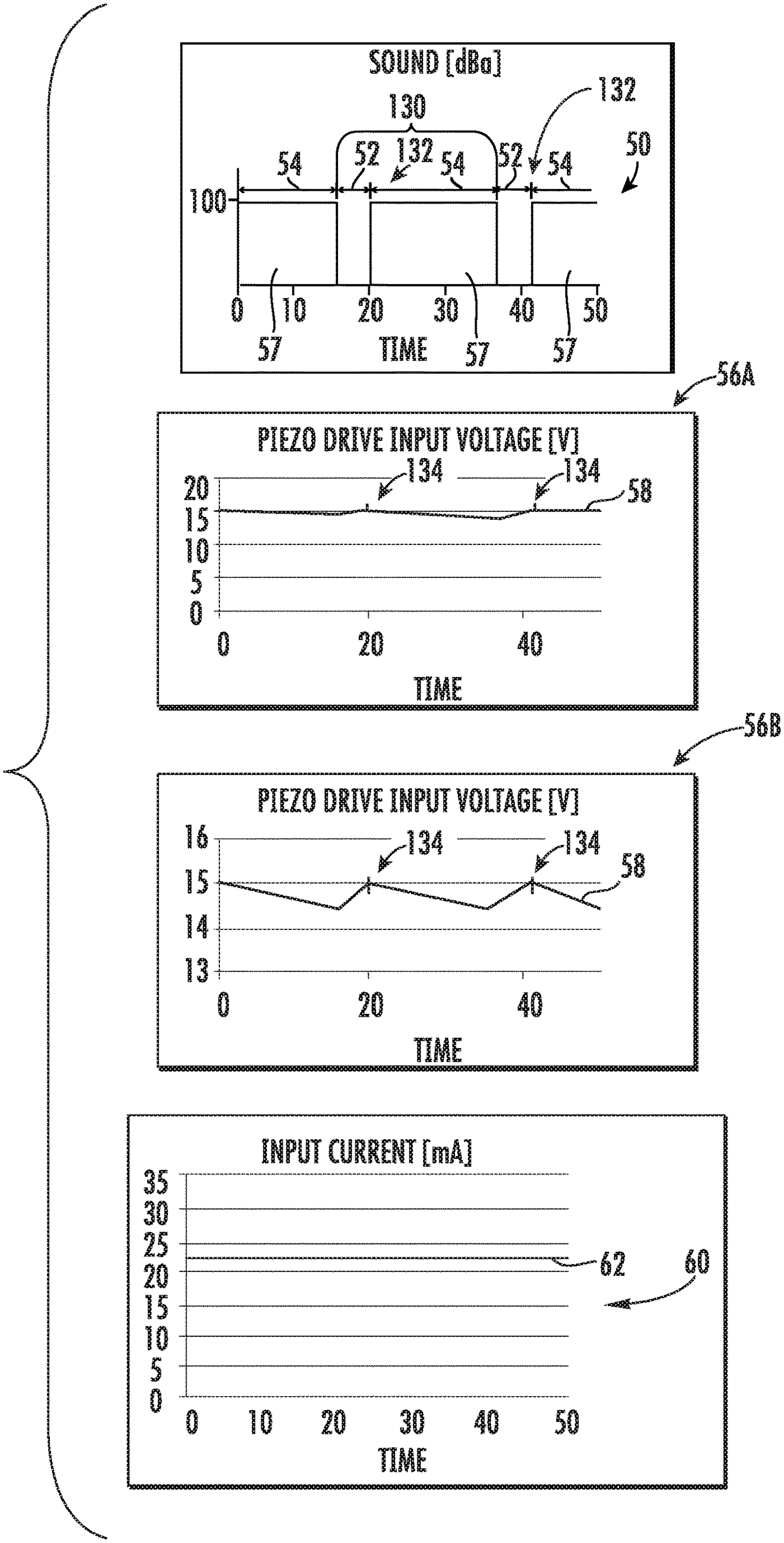
FIG. 5 is a group of graphs representing electrical inputs and sound output of the notification appliance.

Referring to FIG. 5, with continued reference to FIG. 4, the example power control 22 keeps the input current 15 constant by adjusting the current control signal 112 to maintain the driver voltage 128 at a phase 134 (FIG. 5, graphs 56A and 56 B) of the voltage level selected by the sound pattern selection signal 122. Graph 56A and 56B are of the same input voltage 58 shown in different scales to show the small variation and corresponding high and low points that correspond with the sound shown in graph 50. In this example the phase 134 is selected to be synchronous with the transition between no sound and sound shown as phase 132 of graph 50, however, the phase 132 could be any other arbitrary phase of the sound signal level cycle 130. The phase 132 is synchronized to the power control signal 45. Adjustment of the current control signal 112 is accomplished by known methods including feed-forward, proportional integral derivative, or proportional integral controller.

The disclosed input current 15 is therefore constant within recognized variations which may be due to factors such as manufacturing tolerances of components, temperature variations for any one appliance, and differences in temperature between several different appliances. Additionally, the disclosed example constant input current 15 may also include variations that are present due to a dither between discrete levels provided as part of a digital signal. Moreover, the example constant input current 15 may include any additional variations that are present in any electrical device that are otherwise understood to provide a constant input current.

Referring to FIG. 5 with continued reference to FIGS. 2 and 4, during continuing operation (not at startup) the power controller 114 senses driver voltage 128 through its analog the charge level signal 116 and determines a phase 134 based upon power control signal 45. At startup the power controller 114 tailors the input current to achieve ramp rates as described below, and takes initially as input a startup control signal from the startup controller 120 (initially the charge level signal 116 will be close to 0, and will ramp up as charging levels increase). The power controller 114 regulates a selected phase 134 of the driver voltage 128 by adjusting charging current 110 from the current controller 48 through the current control signal 112. Graph 50 illustrates sound pulses 57 that are provided at period 130. Each sound pulse 57 is output for a defined duration 54 followed by an interval of no sound 52. The power controller 114 regulates voltage 58 at a phase 134 shown on graphs 56A and 56B to correspond to the sound level phase shown on graph 50 at 132.

The drive voltage 128 to the transducer driver 30 is illustrated in graphs 56A and 56B and shown as 58. When the transducer 32 is not generating sound, it does not require energy and the current 15 flowing from the NAC 10 is stored in the energy store 46 (FIG. 4). Storage of energy in the energy store 46 increases the charge level 116 of the energy store 46. When the transducer 32 is active and generating sound as shown in graph 50, the sound engine 28 receives energy from the input current 15 along with the energy stored in the energy store 46 when the transducer 30 was not sounding. By buffering energy in the energy store 46 during intervals 52, the input current 62 shown in graph 60 is kept constant and creates a small ripple in the energy store charge level voltage 58 shown in graph 56A.

The power controller 114 is programmable to provide phased regulation of the input voltage 58 to the transducer driver 30. The example input voltage 58 is phase matched to the acoustic pattern shown in graph 50. In this example, the voltage is regulated to a phase just prior to the generation of sound indicated at 57 in graph 50.

The example power control 22 is programmable to set sound power level for a specific application. A notification appliance 24 may need to operate at a reduced volume to accommodate smaller areas and rooms. The use of a resistor to dissipate energy does not provide an optimal decrease in input power and may therefore waste power. The example power control 22 is adjusted to reduce the input voltage 58 to provide the reduced sound power. In one disclosed example, the power controller 114 is programmable at the time of installation to provide several volume settings by reducing the piezo driver input voltage 58. The volume settings can be implemented during installation to match volume to a specific location of installation. The selection can be with a selector switch or through other known means. The power control 22 may also be programmed at the manufacturing and design stage to provide modifications to sound output based on each sound pattern and sound-power combination. In one example, an input voltage 58 can be reduced for intermittent sound patterns as compared to the input voltage 58 utilized for continuous sound patterns. For example, the fire alert pattern 72 may require less sound power as compared to a continuous-high sound pattern.

Figure 6:
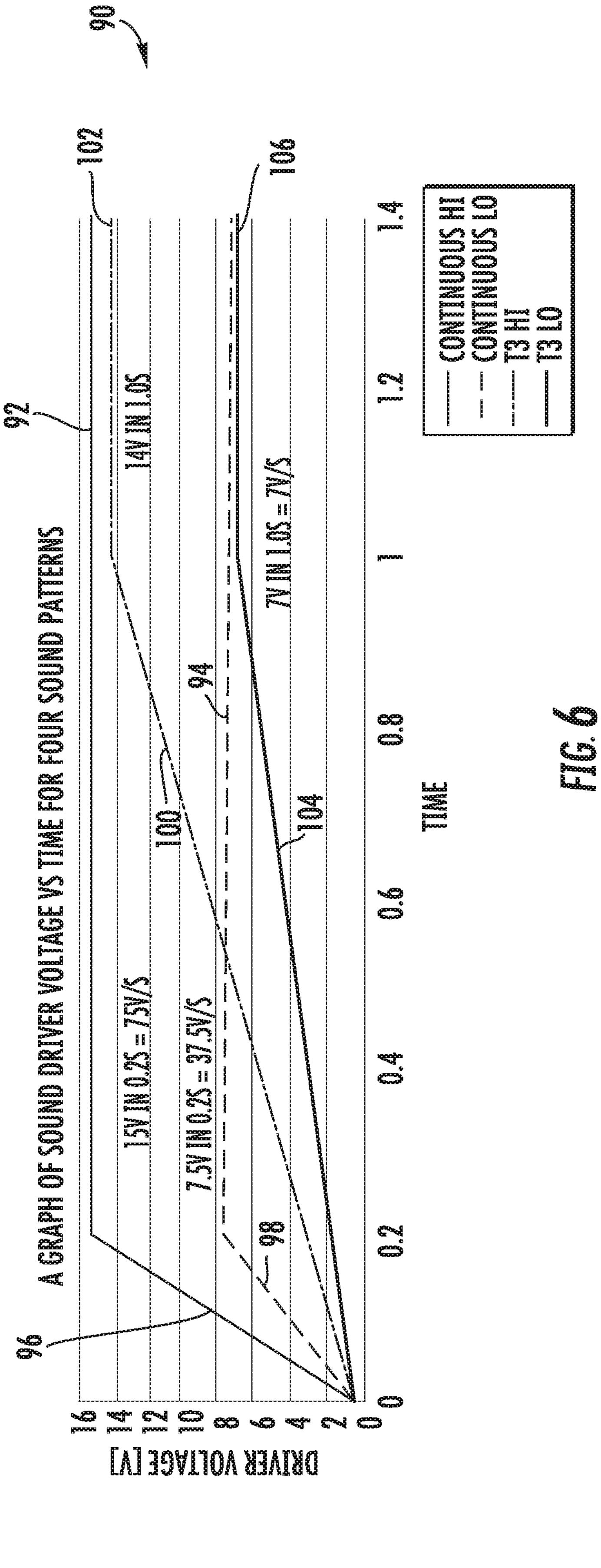
FIG. 6 is a graph illustrating input voltages for different sound patterns.

Referring to FIG. 6 with continued reference to FIGS. 2 and 4, the notification appliance 24 is rated according to current during a running condition and during startup. During startup energy stores are charged to a predefined level prior to generation of a sound. A single fixed ramp rate at a single fixed current for all sound patterns wastes energy for all but the highest sound levels. The example power control 22 tailors the input current to provide different voltage ramp rates for each sound pattern. By varying the voltage ramp rates, the startup current can be maintained below the running current to provide improved current ratings. The control of charging the energy store 46 during startup is by the startup controller 120, as different from the temporal pattern generator 38 which controls the charging of the energy store during running conditions.

The example graph 90 illustrates control of the input current 15 by the power control 22 to tailor the voltage ramp rates 96, 98, 100 and 104 to a corresponding sound pattern. Graph 90 illustrates the running voltage and ramp-rate for different sound patterns. The example ramp-rate is between 7 and 75 volts/second. In another example, the ramp-rate may be between 1 and 110 volts/second. Moreover, it is within the contemplation of this disclosure that the ramp-rate maybe between 0.1 and 1000 volts/second. The voltage indicated at 92 corresponds with a continuous sound pattern with a high sound level 92. The voltage indicated at 94 corresponds with a continuous sound pattern with a low sound level 94. The voltage indicated at 102 corresponds with a fire alert sound pattern at high sound level. The voltage indicated at 106 corresponds with a fire alert sound pattern at a low sound level. Continuous sound levels may require a faster start time and therefore the voltage ramp-rates may be higher.

The start-time for the fire alert sound patterns may be lower and therefore the voltage ramp rates for these sound levels are reduced to reduce the corresponding running current rating. In this example, each voltage 92, 94, 102 and 106 include different ramp rates 96, 98, 100 and 104 that corresponds to the each individual sound pattern. By tailoring the voltage ramp rate to the power needs of each sound pattern, each of the sounds can be rated at the running current instead of a higher startup current needed for only one sound pattern.

The disclosed example appliance 24 includes a power control 22 that utilizes less current by controlling and matching the input voltage to the sound pattern. Control of the input voltage relative to the desired acoustic pattern and shunting current to an energy store 46 when not generating a sound enables the input current to be lower and quasi-constant to provide an overall decrease in current use by the notification appliance.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of powering a sounder comprising:

providing a constant input current; and regulating an input voltage to a phase of a sound engine corresponding with an acoustic signal generated by a sound engine;

storing input current in an energy store responsive to the sound engine not generating sound between phases of the acoustic pattern, wherein a ramp rate of the input voltage to charge the energy store is varied to correspond with the acoustic pattern; and wherein the sound engine draws energy from both the constant input current and the energy store when generating a sound output.

2. The method as recited in claim 1, further comprising regulating the sound output from the sound engine to a constant volume.

3. The method as recited in claim 1, further comprising controlling a power control to decrease the input voltage delivered to the sound engine to reduce the sound output generated by the sound engine responsive to the sound engine being between phases.

4. The method as recited in claim 3, wherein the sound engine draws energy from both the constant input current and the energy store when generating sound.

5. The method as recited in claim 1, further comprising controlling a power control to decrease the input voltage delivered to the sound engine to reduce a sound level generated by the sound engine.

6. The method as recited in claim 5, wherein the power control selects from one of a several input voltage levels to provide a corresponding acoustic signal at a corresponding volume.

7. A notification appliance comprising:

a sound engine generating a sound according to an acoustic pattern;

a power control regulating input voltage to the sound engine that is matched to the acoustic pattern; and an energy store that is charged by the input current and the power control is configured to phase match an input voltage to charge the energy store with the acoustic pattern, wherein when the sound engine is not generating sound the input current charges the energy store and when the sound engine is generating sound, both the input current and energy from the energy store is communicated to the sound engine and wherein the power control is configurable to adjust a voltage ramp rate of the input voltage to match the acoustic pattern.

8. The notification appliance as recited in claim 7, wherein the sound engine generates sound when voltage is input.

9. The notification appliance as recited in claim 8, further comprising an energy store and wherein an input current to the power control is constant and when the sound engine is not generating sound the input current charges the energy store.

10. The notification appliance as recited in claim 9, wherein the energy store provides energy to the sound engine when the sound engine is generating sound.

11. The notification appliance as recited in claim 7, wherein the power control regulates the input voltage to the sound engine to provide a constant volume.

12. The notification appliance as recited in claim 7, wherein the power control is configurable to adjust a sound level generated by the sound engine.

13. The notification appliance as recited in claim 12, wherein the power control is configurable to select between one of several input voltage levels to provide a corresponding sound level.

14. A notification appliance circuit (NAC) comprising:

a plurality of notification appliances connected by circuit wiring to provide electric power, wherein at least one of the plurality of notification appliances comprise a sound engine generating a sound according to an acoustic pattern, and a power control regulating input voltage to the sound engine that is matched to the acoustic pattern and an energy store, wherein an input current from the NAC to the power control is constant and when the sound engine is not generating sound the input current charges the energy store and the energy store provides energy to the sound engine when generating sound, wherein the power control is configurable to adjust a voltage ramp rate of the input voltage to charge the energy store to match the acoustic pattern.

15. The NAC as recited in claim 14, wherein the power control comprises an energy store and wherein an input current from the NAC to the power control is constant and when the sound engine is not generating sound the input current charges the energy store and the energy store provides energy to the sound engine when generating sound.

16. The NAC as recited in claim 14, wherein the power control is configurable to adjust a sound level generated by the sound engine.

17. The NAC as recited in claim 14, wherein the power control is configurable to select between one of several input voltage levels to provide a corresponding sound level.

* * * * *